Aug. 27, 1968   C. J. PETERS   3,399,012
OPTICAL TRANSMISSION LINE FOR GUIDING AN OPTICAL BEAM
Filed Jan. 31, 1964   4 Sheets-Sheet 1

INVENTOR.
CHARLES J. PETERS
BY
*Spencer E. Olson*
ATTORNEY.

Aug. 27, 1968   C. J. PETERS   3,399,012
OPTICAL TRANSMISSION LINE FOR GUIDING AN OPTICAL BEAM
Filed Jan. 31, 1964   4 Sheets-Sheet 3

$$\frac{(n_c - n_o)\,max}{n_o} = \frac{R_b}{2R}$$

$R_b$ = max radius of beam
$R$ = minimum radius of curvature of path
$n_o$ = index of refraction at the outside edge of the beam
$n_c$ = index of refraction at the center of the beam INVENTOR.
CHARLES J. PETERS
BY
*Spencer E. Olson*
ATTORNEY.

Aug. 27, 1968  C. J. PETERS  3,399,012
OPTICAL TRANSMISSION LINE FOR GUIDING AN OPTICAL BEAM
Filed Jan. 31, 1964  4 Sheets-Sheet 4

INVENTOR.
CHARLES J. PETERS
BY
*Spencer E. Olson*
ATTORNEY.

United States Patent Office 3,399,012
Patented Aug. 27, 1968

3,399,012
OPTICAL TRANSMISSION LINE FOR GUIDING
AN OPTICAL BEAM
Charles J. Peters, Wayland, Mass., assignor to Sylvania
Electric Products Inc., a corporation of Delaware
Filed Jan. 31, 1964, Ser. No. 341,566
9 Claims. (Cl. 350—96)

ABSTRACT OF THE DISCLOSURE

An optical transmission line in which an electro-optic fluid contained within a hollow tube is employed to guide a light beam through said tube. The electro-optic fluid is energized via an applied field to vary its refractive index from a maximum value at the axis of the tube to decreasing values toward the periphery of the tube. A light beam travelling within the and along the axis of the tube which tends to deviate from the center line of the tube is refracted toward the region of higher refractive index and thus is guided along the central region of the tube. The fluid can be gaseous or liquid and its index of refraction can be varied by use of the Kerr, Zeeman or Stark effects or by varying the population density of molecular oscillators. The energizing field is chosen according to the physical effect employed and can be applied by several different means such as a coaxial line including the hollow tube, a conductor pair within the tube or conductors axially disposed around the tube.

---

This invention relates generally to communication systems and more particularly to a technique for guiding an optical beam along a curvilinear path over distances in the order of miles with relatively low attenuation.

Whenever light is reflected from a surface or passes from one medium to another, it suffers losses. For example, under the best conditions only 98% of incident light is reflected from metallic surfaces and 99% from multilayer dielectric mirrors. Also, when light travels from an air to a glass medium, approximately 5% of the light is reflected and 95% transmitted into the glass. Anti-reflection coatings improve this transmission to approximately 99%. Furthermore, light travelling through glass is absorbed at the rate of 3 db per meter, whereas through clear distilled water, the absorption rate is 1 db per meter. The foregoing general characteristics of propagated light illustrate the disadvantages of using other than a vacuum or gas as a propagation medium. It is also clear that the desired to propagate light over great distances without losses can only be fulfilled by avoiding reliance on a large number of reflections or air-to-glass interfaces.

Heretofore, several techniques for guiding an optical beam along a particular path have been investigated. However, none of these techniques are suitable for long distance communication because one or more of the loss mechanisms described above have been involved. For example, the IRE Transactions on Antennas and Propagation, volume AP-9, No. 3, pages 249-263, in May 1961, described in some detail a quasi-optical guiding technique, which uses a series of lenses and mirrors. Aside from the difficulty and expense in implementing this approach due to the care required for positioning the lenses and orienting the mirrors, considerable loss occurs because of the great number of air-to-glass interfaces. Furthermore, the approach is somewhat sensitive to mechanical displacement of the elements.

Another guiding technique, which has been studied in considerable detail for short distance use, has been fiber optics. This approach offers the advantage of being able to guide optical beams around extremely sharp bends. However, attenuation is a limiting factor to the use of fiber optics for long distance communication. Fiber optic techinques rely on total reflection, which occurs at the interface between two materials of differing index of refraction, with the light being propagated in the material having the higher index of refraction. The disadvantage of fiber optics is that the inside core of the device is comprised of high absorption material and since the light propagates in the material with the higher index of refraction, it is not feasible to replace presently used materials for the inside core with a low absorbing material such as a gas. Another guiding technique which has been suggested involves the use of a large diameter hollow pipe with a highly reflective inside surface. However, increasing the diameter of the pipe to reduce the number of reflections from the outer wall reduces the radius of curvature by which the optical beam can be turned and narrows the base bandwidth which can be used. Also the reflecting surface is subject to various degradations such as tarnishing and dust accumulation.

G. S. Sprague in Patent No. 2,836,652, issued May 27, 1958, described the construction of two electrodes for producing an electrostatic field which causes the deviation of a light beam. This device is akin to a mirror whose orientation can be varied by means of an applied voltage. It essentially pivots a beam of light about a particular point and the angle of deflection is determined by the magnitude of the applied field. It thus can be classified with the other techniques described in the first few paragraphs of this application which are not suitable for the optical tube application. The Sprague patent specifically teaches a particular electrode shape, namely a knife edge, intended to achieve an intense, non-uniform electric field by means of a modest voltage.

Accordingly, the primary object of the present invention is to provide means for guiding the rays of a light beam through an optical tube with means that do not require structural alteration for each different magnitude of divergence of the beam from the desired path.

Another object of the invention is to provide a long distance optical guiding technique which avoids dependence on reflection of the optical wave.

Still another object of the invention is to provide an optical guide utilizing a fluid as the propagation medium.

A further object of the invention is to provide an optical transmission line capable of guiding an optical beam around comparatively sharp bends.

Briefly, these and other objects are attained in accordance with the invention by a hollow fluid-filled tube and means associated therewith to vary the index of refraction of the fluid. An optical beam, such as that emitted by a coherent light source, is guided along the center line of the tube by the difference in the index of refraction of the fluid at various points across the cross section of the tube. The structure is arranged such that the index of refraction of the fluid decreases in going from the center line to the wall of the tube, whereby as the light beam tends to deviate from the center line it is refracted back.

Other objects, features, and advantages of the invention and a better understanding of its construction and operation will be apparent from the following detailed description, taken in conjunction with the accompanying drawings, in which.

There is currently no optical beam guiding technique which satisfies the objectives of attenuation in the order of 10 db per kilometer, kilomegacycle bandwidth and maximum flexibility. In particular, present approaches usually require that the optical guide be installed along precisely straight lines. Perturbation of this installation, even to the extent caused by the shifting of the earth's surface, is enough to seriously degrade performance. The tube design according to the present invention satisfies the foregoing objectives and can accommodate naturally occurring shifts in the earth as well as guide the optical beam around moderately sharp curves.

Figure 1:
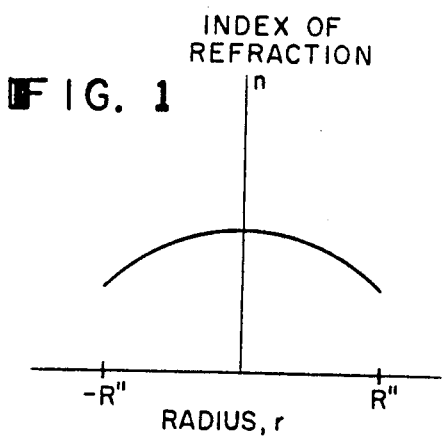
FIG. 1 is a graphical representation of the desired relationship between the index of refraction and the radius of the optical tube.

When a beam of light passes through a medium with a non-uniform index of refraction, the beam will follow a curved path. In general, the path of the beam will always bend toward the region with the higher index of refraction. This phenomenon can be used in an optical tube to continuously bend the rays in a light beam toward the center line of the tube. To accomplish this purpose, a hollow tube is filled with a fluid whose index of refraction is controlled to change from a high value along the center line of the tube or cable to a lower value at the tube walls, as shown by the curve of FIG. 1. This approach has several important advantages; unlike fiber optics or polished light pipes, it does not utilize the lossy process of reflection. Because it does not utilize reflection from the walls, performance will not be degraded by the processes of dust accumulation, oxidation and tarnishing of mirror surfaces. Hence, it is basically a low attenuation technique which accommodates curved paths, allowing the use of such a tube an telephone poles or the like. Furthermore, the optical tube is inherently extremely wideband.

The effective index of refraction of a gas is a function of temperature, pressure, and velocity. Also, certain gases exhibit the Kerr effect in which the index of refraction is a function of an applied electric field. In addition, near the region of anomalous dispersion, the Zeeman or Stark effect can be used to effect a change in the refractive index. Also by varying the population density of molecular oscillators, it is possible to change the index of refraction in the region of anomalous dispersion. Therefore, any of these phenomena can be used to vary the index of refraction.

Figure 2A:
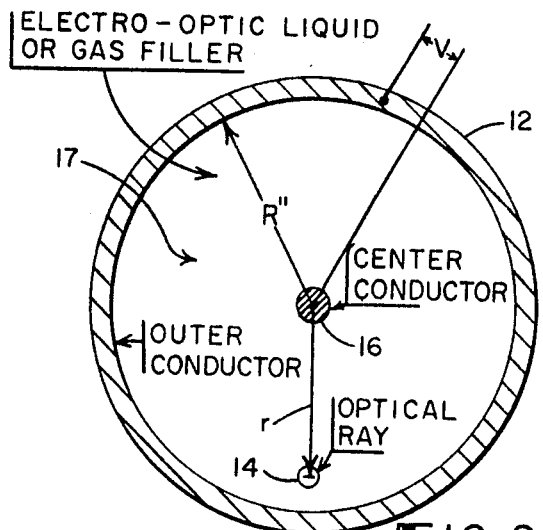
FIG. 2A is a cross-sectional view of the tube taken along line 2A—2A of FIG. 2.
Figure 2:
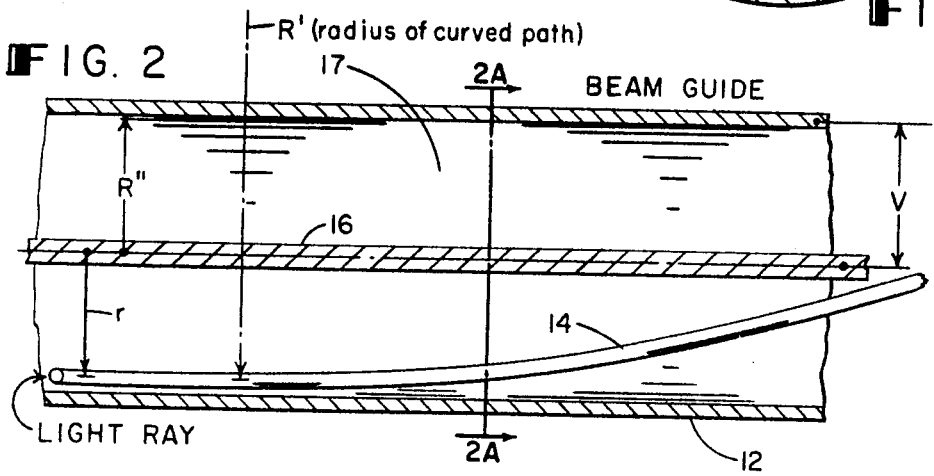
FIG. 2 is a longitudinal cross-section view of an optical tube useful in explaining the invention.

Referring to FIGS. 2 and 2A, an optical tube 12 is shown with a ray 14 of a beam of light (the light beam has many such rays) travelling through the tube, the outer shell of which is formed of conductive material. A center conductor 16 is disposed along the axis of the outer conductor. The tube is filled with a fluid and initially, the light ray is depicted to be at a radius $r$ from the center line of the tube, which has a radius $R''$. When a ray of light travels in a medium in which the index of refraction is continually changing, it will follow a curved path having a radius of curvature equal to $R'$. Various liquids such as carbon disulfide and nitrobenzene and gases such as carbon dioxide and methyl chloride exhibit the Kerr electro-optic effect of a change in its index of refraction by the application of an electric field. One method for applying this field is shown in the coaxial configuration of FIGS. 2 and 2A. A direct-current voltage V is applied between the inner conductor 16 and the outer conductor 12 of the tube with the electro-optic liquid or gas filler 17 being confined between the two conductors and the optical ray 14 travelling through the filler. The effect of the coaxial configuration is to create an intense electric field in the electro-optic material near the center conductor 16 and a less intense field near the outer conductor 12. The electric field varies inversely with the distance from the center conductor and this causes the desired variation in the index of refraction, but high voltages of several hundred kilovolts are required for the operation. Furthermore, since the center conductor intercepts part of the light beam, it would be preferable to use a tube configuration for applying the electric field which does not use a center conductor. However, there is no configuration of electrodes, placed outside of a hollow tube, which will produce a maximum static electric field intensity at the center of the tube.

Figure 3:
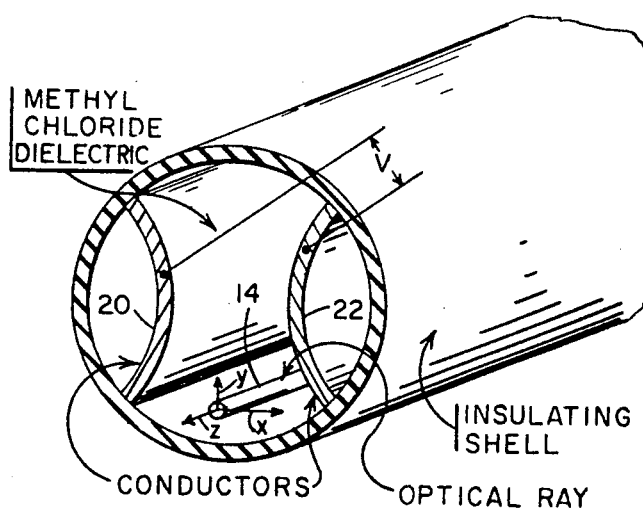
FIG. 3 is an isometric view of an embodiment of the invention wherein an electric field is utilized to center the light beam.
Figure 4:
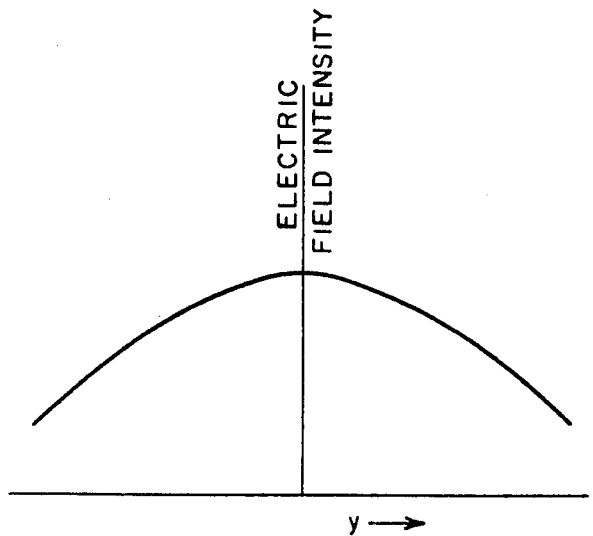
FIG. 4 is a graphical representation of the relationship between the electric field and the distance in the y-direction from the center line of the optical tube of FIG. 3.

An approach to the desired field conditions, and one which avoids the problem of light beam interception, is shown in FIG. 3. In this embodiment, the hollow tube is formed of insulating material and a pair of curved conductors 20 and 22 are positioned therein symmetrically with respect to a vertical plane through the axis of the tube. The tube is filled with a dielectric, such as methyl chloride, and a direct current potential is applied to the electrodes. The conductors 20 and 22 present a convex surface to each other, causing the electrostatic field for $x =$ constant to have a peak value at $y = 0$ as shown in FIG. 4. This is the field distribution which is desired. When an optical beam becomes displaced from $x = 0$, it will encounter a lower index of refraction and be refracted toward the plane $x = 0$.

Figure 5:
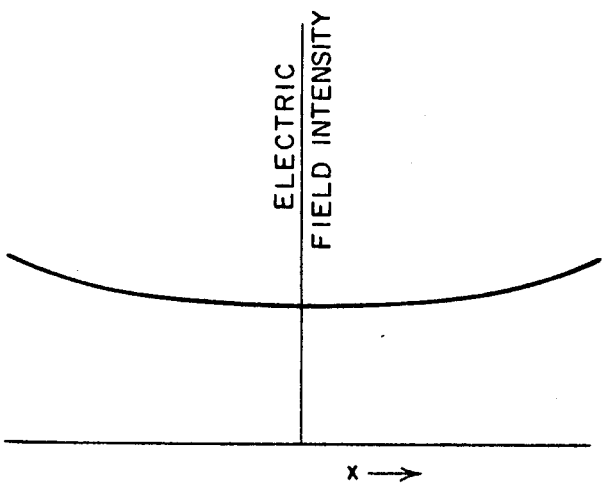
FIG. 5 is a graphical representation of the relationship between the electric field and the distance in the x-direction from the center line of the optical tube of FIG. 3.

In the x-direction, where $y =$ constant, the variation in field intensity is, as shown in FIG. 5, and opposite to what is desired. Because the electric field increases with increasing value of $x$, the index of refraction also increases, and an optical beam, even though centered, would be deflected away from the center line. Consequently, the optical tube shown in FIG. 3, is effective to guide an optical beam in so far as deflections in the $y$ direction are concerned, but does not guide the beam in the $x$ direction.

Figure 6:
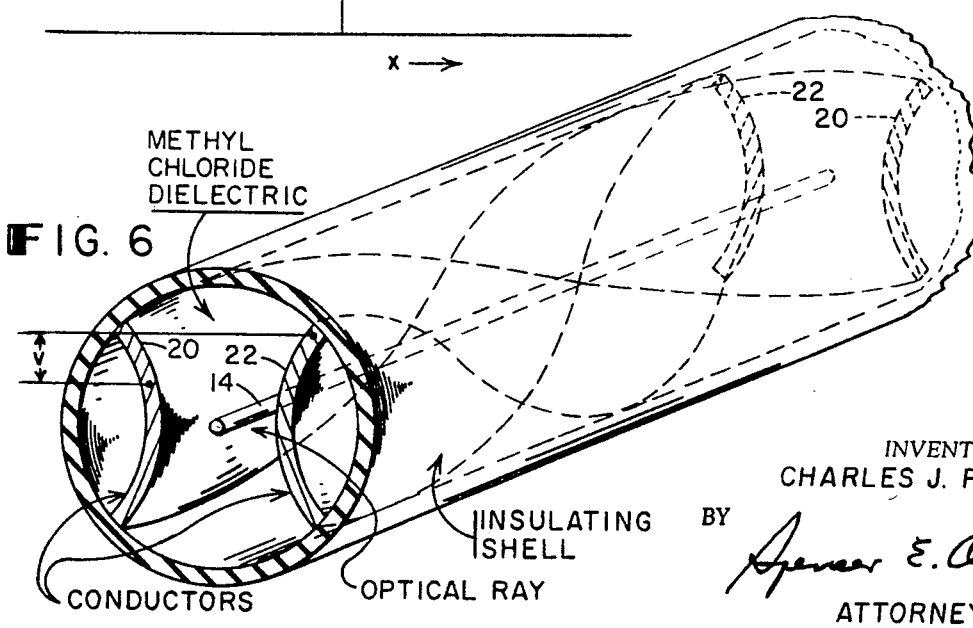
FIG. 6 is an isometric view of an optical tube illustrating a variation of the embodiment of FIG. 3.

Guiding action along both coordinates can be attained by twisting the optical tube, as shown in FIG. 6, so that the two conductors 20 and 22 are interleaved helices having a period of about one complete revolution per meter. The optical beam as it travels down the guide is then subjected to the restoring or guiding action first along one coordinate and then along the other. The conductors are designed so that the effective guiding action dominates the dispersive action.

A modification of this approach is to make the optical guide in short sections in which the conductors in one section are rotated with respect to the conductors in the adjacent sections.

The technique using the electro-optic effect is a most satisfactory way of illustrating the objectives and general approach of this invention. However, several practical difficulties arise in connection with the application of the electric field and the polarization of the light beam. Because of these factors, the preferred embodiment of this invention exploits the marked variation in index of refraction which occurs near absorption or emission frequencies of a gas.

Figure 7:
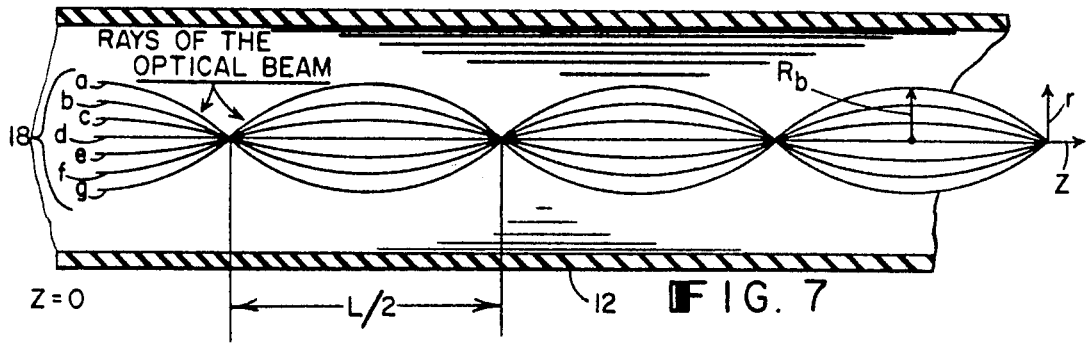
FIG. 7 is a cross-sectional view of a length of optical tube illustrating the desired paths of the light rays travelling through the tube.

Referring now to FIG. 7, for purposes of discussion a typical optical beam 18 will be considered as comprising a plurality of light rays $a$ through $g$. In accordance with the invention, each of these rays is made to travel along a sinusoidal path with a period L. The following derives the necessary variation of the index of refraction to make the ray $a$–$g$ follow a sinusoidal path and cross over the axis at desired intervals.

The desired variation of the index of refraction as a function of the radial distance from the center of the tube to achieve the desired guiding action will be specified first. Then, possible ways to achieve this variation in index of refraction will be described.

Assuming, for analytical convenience, that the optical beam is initially centered in the beam guide and that it is perfectly collimated, because of the variation in index of refraction with radius, each ray of the beam will constantly be bent inwardly to the center line of the tube. Because the rays intersect the center line at an angle, they will pass through the center line following a curved path and again become parallel to the axis at a radius equal to $R_0$. Further assuming that the path of a ray is given by $$\frac{r}{R_o} = \cos 2\pi \frac{Z}{L} \quad (1)$$

where $r=$the radial distance from the center line of the optical tube,
$R_o=$maximum excursion of the ray from the center line of the optical tube,
$Z=$distance along the optical tube, and
$L=$characteristic length along the optical tube, the index of refraction as a function of radius to produce this ray path will be calculated. This will be done by equating the radius of curvature of the path described by Equation 1 to the radius of curvature resulting from the variation in the index of refraction.

The radius of curvature of the sinusoidal path is $$S = -\frac{\left[1 + \frac{4\pi^2}{L^2}(R_o^2 - r^2)\right]^{3/2}}{\frac{4\pi^2 r}{L^2}} \quad (2)$$

The radius of curvature for a ray travelling in a medium with a non-uniform index of refraction is $$R' = + \frac{n}{\nabla_\perp^{(n)}} \quad (3)$$

where $R'$ is the radius of curvature of the path,
$n$ is the index of refraction at distance $r$ from the tube center, and
$\nabla_\perp n$ is the gradient of the index of refraction perpendicular to the path.

Assuming that $L \gg R_o$ so that the ray at most makes a small angle with the axis, Equation 3 can be approximated by $$R' = \frac{n}{\frac{dn}{dr}} \quad (4)$$

Equating Equations 4 and 2:

$$\frac{n}{\frac{dn}{dr}} = -\frac{\left[1 + \frac{4\pi^2 R_o^2}{L^2} - \frac{4\pi^2 r^2}{L^2}\right]^{3/2}}{\frac{4\pi^2 r}{L^2}} \quad (5)$$

is a differential equation for the index of refraction, $n$, as a function of radius. The solution of this differential equation is $$\frac{n}{n_c} = \exp\left\{-\frac{L}{2\pi a}\left[\frac{1 - \left(1 - \frac{r^2}{a^2}\right)^{1/2}}{\left(1 - \frac{r^2}{a^2}\right)^{1/2}}\right]\right\} \quad (6)$$

where $$a^2 = \frac{L^2}{4\pi^2} + R_o^2$$

and $n_c$ is the index of refraction at the center of the tube.

Assuming that $r/a \ll 1$ and $L \gg R_o$, Equation 6 can be simplified to $$\frac{n - n_c}{n_c} \cong -\frac{2\pi^2 r^2}{L^2} \quad (7)$$

Equation 7 has the extremely interesting feature that the index of refraction $n$ is independent of $R_o$. This means that all rays, no matter what their initial position, will have the same periodic length, L, and that all the rays will periodically be brought to true focus as shown in FIG. 7. A change in index of refraction of $5 \times 10^{-6}$ from the center line of the optical tube out to a radial distance of 4 millimeters will be sufficient to bring the beam to a true focus every 8 meters. Therefore, an extremely small change in the index of refraction is capable of guiding the optical beam along the center line of the tube.

One of the main design objectives in this optical tube is to permit laying of the tube along curved paths. Roughly speaking, the sharpest curve around which this tube can guide a beam will occur when the radius of curvature of the tube path equals the minimum radius of curvature of a ray. Thus, evaluating Equation 7 at $r = R_b$, the radius of the beam, solving the result for L, and substituting into Equation 2, the following expression is obtained:

$$R = \frac{R_b}{2\Delta n}$$

where $$\Delta n = \frac{n_c - n_o}{n_o} \quad (8)$$

for the minimum radius of curvature of the path of the optical tube, R, in terms of the radius of the beam, $R_b$, and the change in index of refraction across the cross section of the beam $\Delta n$. The optical tube described above would guide a beam around a curve with a radius of 400 meters.

Figure 8:
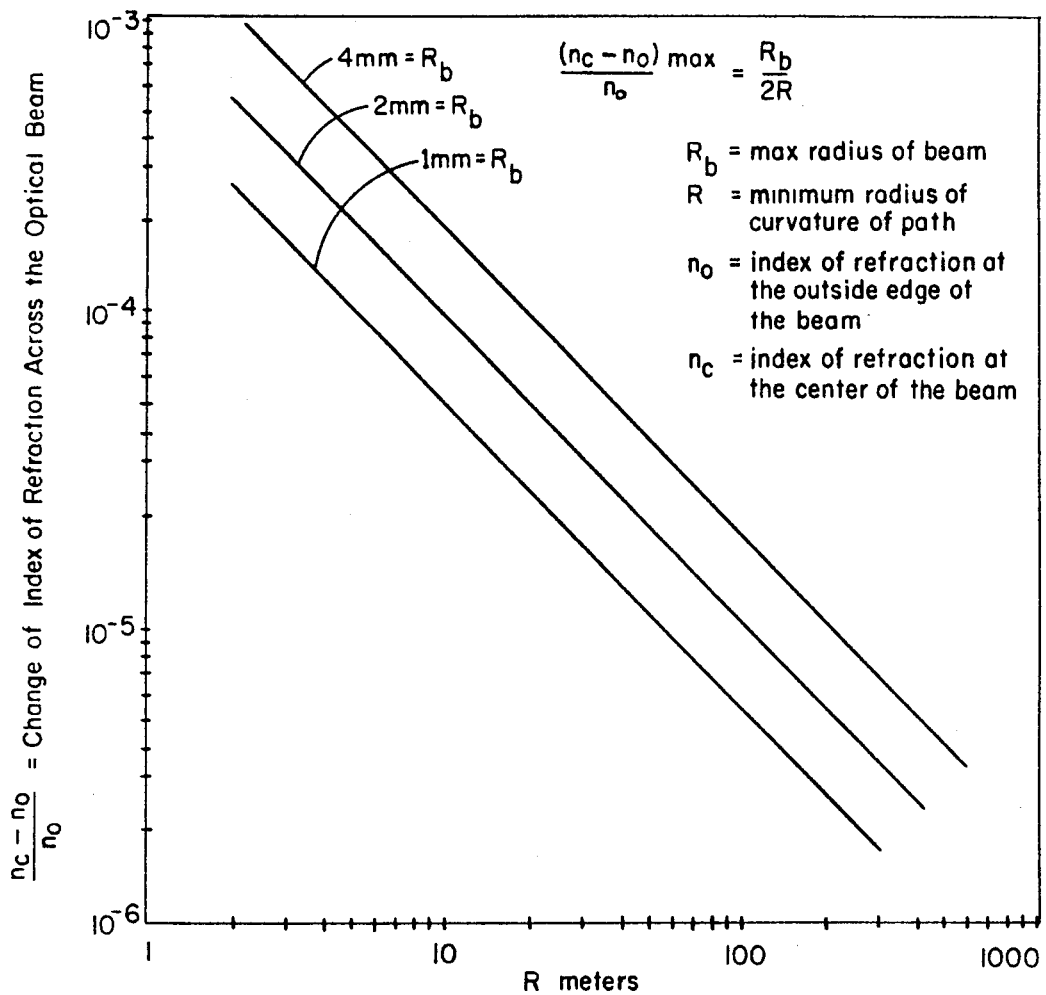
FIG. 8 is a log-log plot of the relationship between the change in index of refraction and the radius of curvature of the optical tube path.

Referring to FIG. 8, the variation in the index of refraction as a function of the minimum radius of curvature to be negotiated is depicted for beams of different diameters. For instance, it can be seen that if a 100 meter radius of curvature of an optical beam is desired (approximately that radius necessary when a tube or cable is suspended from telephone poles), and the beam has a radius of 2 millimeters, the index of refraction must change by one part in $10^5$ in order to effectively guide the beam around the curve. If the tube has a radius of curvature of 1000 meters, as might be found on a highway or railroad, and the beam has a radius of 4 millimeters, the index of refraction must change by one part in $5 \times 10^5$ in order to guide the beam as desired.

The remaining portion of this application will be devoted to a description of preferred methods of establishing the desired variation in index of refraction.

Figure 9:
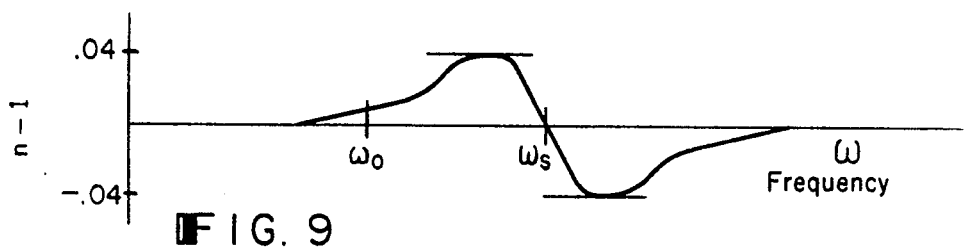
FIG. 9 is a curve illustrating anomalous dispersion of the index of refraction in the region of an absorption line.

If the frequency spectrum of light transmitted through a gas in the optical region is measured, discrete frequency bands will be observed at which the attenuation or absorption of light is extremely high. This absorption phenomenon is very similar in mathematical description to the resonance phenomena observed in electrical L-C circuits and, in fact, is described as a resonance of the molecules making up the gas. For frequencies near the resonant frequency or the absorption line, the index of refraction of the gas exhibits variations as large as 3 or 4 percent, (See FIG. 9.) This phenomenon is called anomalous dispersion of the index of refraction.

This same variation in absorption and index of refraction occurs around an emission line of a gas. There are several ways to vary the index of refraction observed at a frequency $\omega_0$ which is near to an absorption or emission line. One way to vary the index of refraction is to shift the absorption or emission frequency of the gas. This shifting can be accomplished by means of the Zeeman or Stark effect. Another way to vary the index of refraction is to vary the number of molecular oscillators at the absorption or emission line of interest. This variation in density of molecular oscillators across the cross section of the optical beam can be achieved by varying the density of the gas. Also, if an emission line stimulated by an electric discharge is used, the desired distribution of molecular oscillators comes about almost automatically because absorption of the excited molecules at the walls of the tube leads to the desired higher concentration at the center. This process can be augmented by causing the discharge to be more intense in the center than at the edges.

Figure 10:
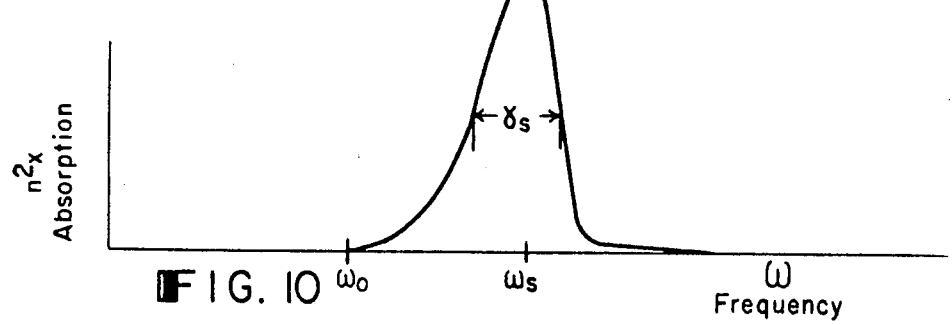
FIG. 10 is a curve illustrating the absorption of light in the region of an absorption line.

Defining the frequency of the resonance line as $\omega_s$ and assuming that the frequency of the coherent light to be guided by the optical tube is $\omega_0$, in the region of an absorption line of a gas (see FIG. 10), the gas exhibits very strong absorption or attenuation of light. It is necessary to choose an operating frequency $\omega_0$ sufficiently displaced from the absorption line frequency $\omega_s$ so that the attenuation of the light is within acceptable limits. The absorption width of the gas is described by a parameter $\gamma_s$ which is the total width of the absorption curve measured at a point where the absorption falls to ½ its maximum value. Criterion are therefore presented by which the value of $\omega_s$ and the width of the absorption line $\gamma_s$ can be chosen.

From these considerations it is possible to explicitly define the characteristics of the gas required for the optical tube. These specifications of the optical tube gas are compared in this section with the properties for common gases to show that the desired properties are within practical limits.

From the calculation of the shift in $\omega_s$ required to attain the desired variation in the index of refraction, the magnitude of the magnetic field required and the magnitude of the electrical field can be estimated and are found to be reasonable.

The complex index of refraction of a gas near an absorption or resonance line is:

$$n^2 = n_c^2 + 4\pi \frac{Ne^2}{m} \frac{F_s}{\omega_s^2 - \omega^2 + i\gamma_s\omega} \quad (9)$$

where

N is the number of molecules per unit volume,
$e$ is the charge on an electron $=4.8 \times 10^{-10}$ e.s.u.,
$m$ is the mass of an electron $=9.1 \times 10^{-28}$ gm.,
$F_s$ = number of oscillators per molecule at the frequency $\omega_s$,
$\omega_s$ is the absorption or resonant frequency of the gas, and
$\gamma_s$ is the half width of the absorption line.
$i = \sqrt{-1}$.

In this expression, $n^2$ is a complex quantity which contains both the real index of refraction $n$ and the absorption coefficient $\alpha$. Separating the real and imaginary parts of this expression, we obtain expressions for the real index of refraction and for the absorption coefficient (Equation 11).

$$n = n_c + \frac{4\pi e^2}{n_c m\omega_s} \cdot \frac{NF_s(\omega_s - \omega)}{4(\omega_s - \omega)^2 + \gamma_s^2} \quad (10)$$

$$n_2 x = \frac{2\pi e^2}{m\omega_s} \cdot \frac{NF_s\omega_s}{4(\omega_s - \omega)^2 + \gamma_s^2} \quad (11)$$

Equation 10 shows several variables which might be used to achieve variation in the index of refraction of a gas. First, $\omega_s$, the resonant frequency of the gas, can be changed by applying a magnetic or electric field. The magnetic effect is called the Zeeman effect and the electric effect is called the Stark effect. A third way to change the index of refraction is to vary the parameter $NF_s$ which is the number of molecular oscillators at the frequency $\omega_s$.

Calculating the change in the absorption line frequency of $\omega_s$ required to obtain the desired change in index of refraction $\Delta n$ by differentiating Equation 10, the result is:

$$\Delta n \cong \frac{4\pi Ne^2F_s}{n_c m} \left\{ \frac{\gamma^2 - 4\Omega^2}{\omega_s[\gamma^2 + 4\Omega^2]^2} \right\} \Delta\omega_s \quad (12)$$

where $\omega_s - \omega_0 = \Omega$ and $\Omega \ll \omega_s$.

From this expression it can be seen that the damping constant $\gamma_s$ enters into the consideration only indirectly because the operation is at a frequency at which $|\omega_s - \omega_0| \gg \gamma_s$. Under these conditions, Equation 12 can be simplified and solved for the variation in the absorption line frequency $\Delta\omega_s$.

$$\Delta\omega_s = \frac{n_c m\omega_s\Omega^2}{\pi Ne^2F_s}\Delta n \quad (13)$$

This equation indicates that one would like to operate at a frequency $\omega_0$ as close as possible to the line frequency $\omega_s$, since the magnitude of the frequency shift $\Delta\omega$ required is proprotional to the square of the difference frequency $\Omega$. This requirement competes with that of separation of $\omega_0$ and $\omega_s$ to avoid strong attenuation near $\omega_s$. Calculating the magnitude of the absorption or attenuation of light as it passes through the gas and assuming the light is traveling along the Z axis, the light power can be expressed in the form shown in Equation 14:

$$P = P_0 e^{-2\alpha Z} \quad (14)$$

In this expression $P_0$ is the initial power in the wave. The attenuation coefficient $\alpha$ is related to $n^2x$ of Equation 11 so that the attenuation coefficient is:

$$2\alpha = \frac{4\pi Ne^2\omega}{mcn\omega_s} \frac{F_s\gamma_s}{4(\omega_s - \omega)^2 + \gamma_s^2} \quad (15)$$

Again representing $\omega_s - \omega_0 = \Omega$ and assuming $\Omega \ll \omega_s$, Equation 15 can be simplified to:

$$2\alpha = \frac{\pi Ne^2\omega}{mcn\omega_s} \frac{F_s\gamma_s}{\Omega^2} \quad (16)$$

Solving this expression for the ½ width of the absorption line:

$$\gamma_s = \Omega^2 \frac{(2\alpha)mcn\omega_s}{\pi Ne^2\omega F_s} \quad (17)$$

Dividing Equation 17 by 13 and solving for $\Delta n$ $$\Delta n = \frac{\Delta\omega_s}{\gamma_s}(2\alpha)\frac{c}{\omega} \quad (18)$$

where $c$ is the speed of light. This relation is a fundamental criteria to be used in the choice of the gas for the optical tube. It gives the resulting change in index of refraction as a function of the change in the absorption line frequency with the ½ line width $\gamma_s$ as a parameter. This equation defines a series of hyperbola for $\Delta n$ as a function of $\gamma_s$. Assuming that an attenuation of 10 db per kilometer is acceptable, a change in index of refraction of $10^{-5}$ can be accomplished by a shift in the line frequency, $\omega_s$, of $2\pi \times 10^9$ per second or 1 kmc. The width of the absorption line should be $1.5 \times 10^5$ seconds$^{-1}$.

If this change in index of refraction is to be accomplished by means of the Zeeman effect, calculations show that a magnetic field in the order of 2000 gauss would be required. This magnitude of field can be established by means of permanent magnets. The ½ line width of the order of $10^5$ seconds$^{-1}$ is exhibited by such gases as mercury vapor. The same change in index of refraction can be obtained by means of the Stark effect by applying an electric field to the gas on the order of several hundred thousand volts per centimeter.

Figure 11:
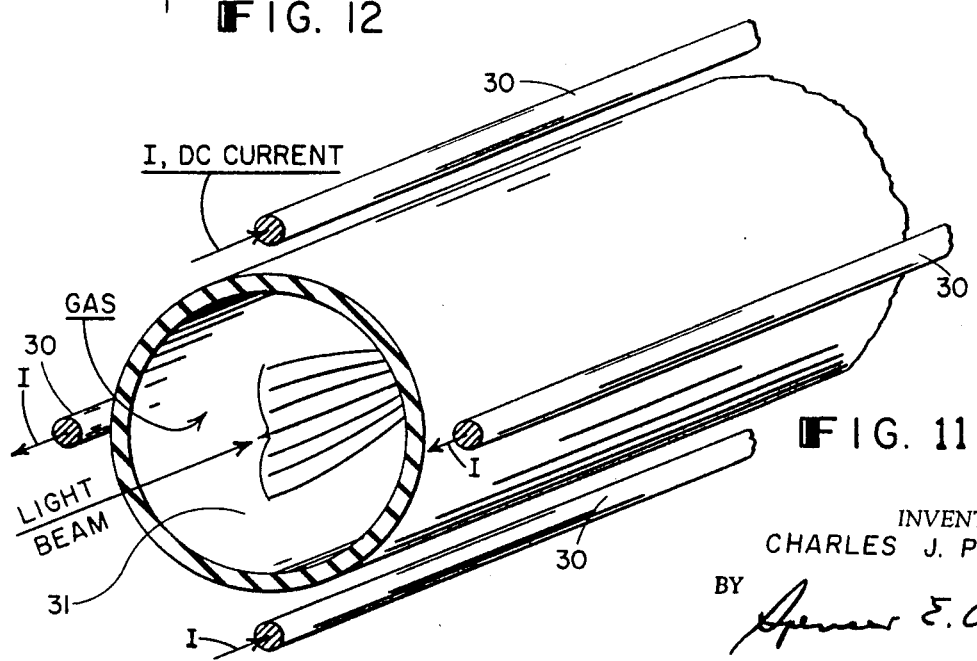
FIG. 11 is a sectioned isometric view of another embodiment of the invention wherein the Zeeman effect is utilized to shift the absorption or emission frequency of a gas within the optical tube.

An optical tube utilizing the Zeeman effect for guiding the beam along the center line is shown in FIG. 11. In this embodiment, the outer shell is formed of insulating material, and conductors 30 carrying direct current are used to establish the desired magnetic field in the gas 31 contained in the tube. The conductor configuration shown in FIG. 11 will produce a magnetic field which is zero in the center of the optical tube and increases regularly with distance from the center. The optical tube consists of a tube filled with a gas possessing a resonance line at the desired frequency. If this resonance line occurs because of the transition between two excited states of the molecule, an electrical discharge must be maintained through the gas to populate the lower excited state. This discharge may be produced by means well known in the art, which are not shown.

One suitable means for producing the discharge would be a series of electrodes outside the tube across which a high radio frequency potential is applied. In this case the tube should be a dielectric such as glass. Another means for establishing a discharge in a gas would be to incorporate electrodes inside the tube in a manner similar to that used in neon signs. A discharge would be produced by applying a high electric potential between the electrodes.

If an absorption line is used, it is not necessary to excite the gas.

An optical tube utilizing the Stark effect can be represented by the configurations of FIGS. 3 and 6. The main difference between this embodiment and that using the Kerr effect would be in the gas used to fill the tube. Using the Stark effect, a gas which has a resonance frequency near the frequency of operation would be used. The same considerations would apply in embodiment of FIG. 6 with twisted electrodes.

A variation in the index of refraction of the gas can also be obtained by varying the quantity $NF_s$ in Equation 10. Assuming that $\omega_s$ arises from a transition between two excited states in the gas, anomalous dispersion at this frequency would occur only after the gas were excited by some means such as an electrical discharge. The number of molecular or atomic oscillators $NF_s$ at the frequency $\omega_s$ would depend upon the intensity of the discharge. Thus, the index of refraction variation can be controlled by varying the current density in the discharge as a function of radius. Alternatively, if the discharge is uniform across the cross-section of the tube, there are various processes such as recombination of the ionized particles at the walls of the discharge tube which will tend to produce the desired variation of $NF_s$ as a function of radius. Neglecting $\gamma$ in Equation 10 and substituting $Q$ for $NF_s$, population density, and differentiating, the following equation 19 is obtained $$\Delta n = \frac{\pi e^2 \Delta Q}{n_o m \omega_s \Omega} = \frac{\pi e^2 A Q}{n_o m \omega_s \Omega} \quad (19)$$

where $Q = NF_s$, population density
$A = \Delta Q / Q$

This expression gives the relation between the change in population density and the resulting change in index of refraction. The geometrical aspect of tube path can be introduced into this equation by substituting for $\Delta n$ by Equation 8

$$\frac{R}{R_b} = \frac{1}{2\Delta n}$$

The result of this operation is:

$$Q = \frac{mR_b \omega_s}{2e^2 \pi AR} \Omega \quad (20)$$

where the population density has been computed. Equation 17 can be used to obtain a specification of the line width under these conditions $$\gamma_s = \frac{4cA\Omega\alpha R_n}{\omega R_b} \quad (21)$$

Figure 12:
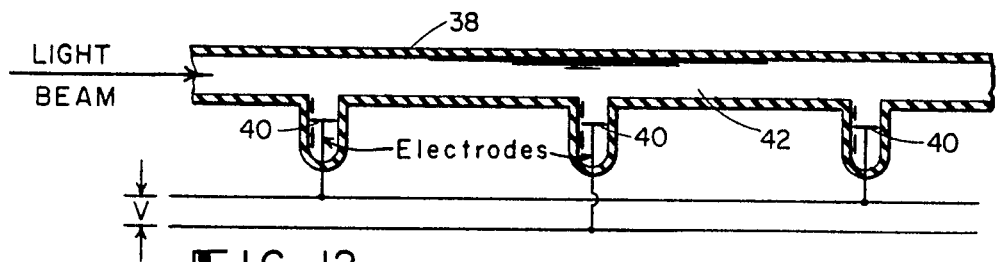
FIG. 12 is a cross-sectional view of a further embodiment of the invention wherein the light beam is centered by changing the population of molecular or atomic oscillators.

From these relations it is possible to evaluate various gases from the optical tube application. Desired values for $\gamma_s$ range from $2.8 \times 10^6$ sec.$^{-1}$ to $2.7 \times 10^7$ sec.$^{-1}$ which corresponds to lifetimes of $4 \times 10^{-8}$ to $4 \times 10^{-7}$ sec. A typical lifetime of an excited state is on the order of $10^{-7}$ to $10^{-9}$ sec. Thus a number of gases will be suitable. The population density required ranges from $10^{15}$ to $10^{16}$ per centimeter. This implies that the gas pressure would be on the order of a fraction of an atmosphere. These typical values are postulated on an operating wavelength of $\lambda = 6328$ Angstroms at an attenuation of 10 db per kilometer and a ratio of $10^4$ between the radius of curvature of the path and the radius of the beam. A representative embodiment of this tube is shown in FIG. 12, and comprises a long glass tube 38 containing regularly spaced electrodes 40 filled with an appropriate gas 42 such as xenon or hydrogen. A discharge is established in the gas by applying a high electrical potential V between the electrodes. The variation in the population density occurs naturally in this design because of the absorption of excited particles at the walls of the optical tube. The lower the population becomes, the lesser the index of refraction is, thereby bending the beam to the tube center.

Although the invention has been described as embodied in an optical tube for guiding a light beam, the principles can be applied to any electromagnetic wave if the wavelength $\lambda$ satisfies $\lambda \ll R_b$. Thus, the practical frequency range might extend from the millimeter range to the ultraviolet.

While particular embodiments of the invention have been shown and described, modifications may be made, and it is intended in the appended claims to cover all such modifications as fall within the true spirit and scope of the invention.

What is claimed is:

1. A device for guiding a beam of electromagnetic radiation having a radius of $R_b$ through a curvilinear path of minimum radius R comprising:
    a hollow cylindrical tube conforming to said curvilinear path;
    a fluid filling said hollow tube and having a resonant frequency dispaced from the frequency of said electromagnetic radiation;
    and a plurality of current conducting members disposed parallel to the center line of the tube and substantially equally spaced around the periphery of said tube to produce a greater magnetic field near the walls of the tube than at the center of the tube, thereby controlling the index of refraction of said fluid to vary from a high value at the center line of said tube to a lower value near the periphery of said tube so that said beam of electromagnetic radiation tends to be guided along the center line of said hollow tube as said beam travels along the length thereof.

2. A device for guiding a beam of electromagnetic radiation having a radius of $R_b$ through a curvilinear path of minimum radius R comprising:
    a hollow cylindrical tube formed of insulating material and conforming to said curvilinear path;
    a fluid filling said hollow tube; and
    conducting interleaved helical members within said tube for causing said fluid to be characterized by an index of refraction which increases to the axis of said tube by an increment of at least $R_b/2R$ from its value at a radial distance of $R_b$ so that said beam of electromagnetic radiation tends to be guided along the axis of said hollow tube as said beam travels along the length thereof.

3. An optical transmission line for guiding a beam of light along a desired curvilinear path comprising:
    a hollow tube conforming to the desired curvilinear path and containing an electro-optic fluid having an index of refraction variable in response to an electromagnetic influence; and
    means for applying an electromagnetic field to said tube, the intensity of field varying with the distance from the axis of the tube to vary the refractive index of said fluid within said tube from a maximum value at the axis of the tube to decreasing values toward the periphery of the tube, whereby a light beam travelling along the axis of said tube which tends to deviate from the axis is refracted toward the central region thereof as said beam travels along the length of said tube.

4. The invention according to claim 3 wherein said electromagnetic field is an electric field and said means includes a pair of curved conductors twisted so as to form an interleaved helix and positioned within said hollow tube.

5. An optical transmission line for guiding a beam of light along a desired curvilinear path comprising:
   a hollow tube conforming to the desired path;
   a fluid filling said hollow tube and having a predetermined spectral line near the frequency of the light to be guided, said spectral line being generated when energy is supplied to said fluid;
   an energy source coupled through said tube to said fluid and operative to supply the necessary energy to said fluid to generate said spectral line; and
   means for generating within said hollow tube an electromagnetic field, the intensity of said field varying with the distance from the axis of said tube for selectively varying a characteristic of the spectral line of said fluid to cause the index of refraction of said fluid to vary from a high value at the center line of said tube to a lower value near the periphery of said tube.

6. The invention according to claim 5 in which said fluid is a gas and said means includes magnetic means operative to apply a magnetic field to said fluid within said tube, the intensity of said field varying directly with the distance from the axis of the tube and having sufficient magnitude to vary the frequency of said spectral line to produce a specified change in the index of refraction of said fluid.

7. The invention according to claim 5 in which said fluid is a gas and said means includes electrical means operative to apply an electric field to said fluid within said tube, the intensity of said field varying inversely with the distance from the axis of said tube and having sufficient magnitude to vary the frequency of said spectral line to produce a specified change in the index of refraction of said fluid.

8. An optical transmission line for guiding a beam of light along a desired curvilinear path comprising:
   a hollow tube conforming to the desired curvilinear path;
   a fluid filling said hollow tube and having a predetermined spectral line near the frequency of the light to be guided, said spectral line being generated when energy is supplied to said fluid;
   an energy source coupled through said tube to said fluid and operative to supply the necessary energy to said fluid to generate said spectral line; and
   means coupled to said tube for varying the fluid population density inversely with the distance from the axis of said tube causing the index of refraction of said fluid to vary from a high value at the axis of said tube to a lower value near the periphery of said tube.

9. The invention according to claim 8 where said means comprises a plurality of selectively placed electrodes disposed on one side of said tube and means for applying a high potential between adjacent electrodes to maintain an electrical discharge in the fluid whereby the density of said fluid and thus the index of refraction are varied inversely with the distance from the axis of the tube.

References Cited
UNITED STATES PATENTS

| | | | |
|---|---|---|---|
| 2,915,943 | 12/1959 | Brown et al. | 350—160 |
| 3,030,852 | 4/1962 | Courtney-Pratt | 88—1 X |
| 3,067,420 | 12/1962 | Jones et al. | |
| 3,083,123 | 3/1963 | Navias. | |

JOHN K. CORBIN, *Primary Examiner.*